US009462202B2

(12) United States Patent
Wang et al.

(10) Patent No.: US 9,462,202 B2
(45) Date of Patent: Oct. 4, 2016

(54) PIXEL ARRAYS AND IMAGING DEVICES WITH REDUCED BLOOMING, CONTROLLERS AND METHODS

(71) Applicants: Yibing Michelle Wang, Temple City, CA (US); Hongyu W. Wang, San Gabriel, CA (US)

(72) Inventors: Yibing Michelle Wang, Temple City, CA (US); Hongyu W. Wang, San Gabriel, CA (US)

(73) Assignee: SAMSUNG ELECTRONICS CO., LTD. (KR)

(*) Notice: Subject to any disclaimer, the term of this patent is extended or adjusted under 35 U.S.C. 154(b) by 91 days.

(21) Appl. No.: 13/940,245

(22) Filed: Jul. 11, 2013

(65) Prior Publication Data
US 2014/0362260 A1 Dec. 11, 2014

Related U.S. Application Data

(60) Provisional application No. 61/832,140, filed on Jun. 6, 2013.

(51) Int. Cl.
*H04N 5/359* (2011.01)
(52) U.S. Cl.
CPC .......... *H04N 5/3591* (2013.01); *H04N 5/3594* (2013.01)
(58) Field of Classification Search
CPC .................................................. H04N 5/3592
See application file for complete search history.

(56) References Cited

U.S. PATENT DOCUMENTS

| | | | |
|---|---|---|---|
| 4,742,381 A | 5/1988 | Fujii | |
| 5,808,333 A | 9/1998 | Maruyama et al. | |
| 5,854,100 A | 12/1998 | Chi | |
| 6,169,318 B1 | 1/2001 | McGrath | |
| 6,351,001 B1 | 2/2002 | Stevens et al. | |
| 6,580,106 B2 | 6/2003 | Hynecek | |
| 6,710,804 B1 | 3/2004 | Guidash | |
| 7,026,185 B2 | 4/2006 | Lee | |
| 7,381,936 B2 | 6/2008 | Tan et al. | |
| 7,402,881 B2 | 7/2008 | Kuwazawa | |
| 7,508,432 B2 | 3/2009 | Parks et al. | |
| 8,130,294 B2 | 3/2012 | Fowler et al. | |
| 2008/0217659 A1 | 9/2008 | Hung et al. | |
| 2008/0284876 A1* | 11/2008 | Makino | 348/231.99 |

(Continued)

FOREIGN PATENT DOCUMENTS

| | | |
|---|---|---|
| JP | 4923596 | 4/2012 |
| WO | 9743788 | 11/1997 |

(Continued)

OTHER PUBLICATIONS

Luciano Sbaiz et al., "The Gigavision Camera," 2009, pp. 1093-1096.

*Primary Examiner* — Albert Cutler
(74) *Attorney, Agent, or Firm* — Renaissance IP Law Group LLP

(57) ABSTRACT

A pixel array includes regular pixels for imaging, and special pixel sites interspersed among the regular pixels. When the regular pixels become saturated from bright illumination, at least some of their excess charges are removed by the special pixel sites. The removal can reduce or eliminate blooming. In some embodiments, the special pixel sites include special pixels. For imaging, the regular pixels of a group such as a sub-array provide regular outputs that are combined into a composite signal. The special pixels provide a special output. The special output of the group may optionally be added to the composite signal, which can increase the dynamic range.

5 Claims, 12 Drawing Sheets

(56) References Cited

U.S. PATENT DOCUMENTS

| | | |
|---|---|---|
| 2009/0002528 A1* | 1/2009 | Manabe et al. ............ 348/248 |
| 2009/0021612 A1* | 1/2009 | Hamilton et al. .......... 348/249 |
| 2010/0133592 A1* | 6/2010 | Mori et al. ................ 257/255 |
| 2011/0121421 A1 | 5/2011 | Charbon et al. |
| 2011/0149274 A1 | 6/2011 | Rissa et al. |
| 2011/0176019 A1 | 7/2011 | Yang et al. |
| 2011/0205384 A1 | 8/2011 | Zarnowski et al. |
| 2012/0241591 A1* | 9/2012 | Wan et al. ................ 250/208.1 |
| 2013/0026594 A1 | 1/2013 | McCarten et al. |
| 2013/0075588 A1* | 3/2013 | Kawaguchi ............... 250/208.1 |
| 2014/0118588 A1* | 5/2014 | Puetter .............. H04N 5/35563 348/300 |
| 2014/0267828 A1* | 9/2014 | Kasai .................... H04N 9/045 348/229.1 |

FOREIGN PATENT DOCUMENTS

| | | |
|---|---|---|
| WO | 9746004 A | 12/1997 |
| WO | WO2013008596 * | 1/2013 |

* cited by examiner

*IMAGING DEVICE*

ARRAY WITH SPECIAL PIXELS
(IN SIFTER PATTERN)

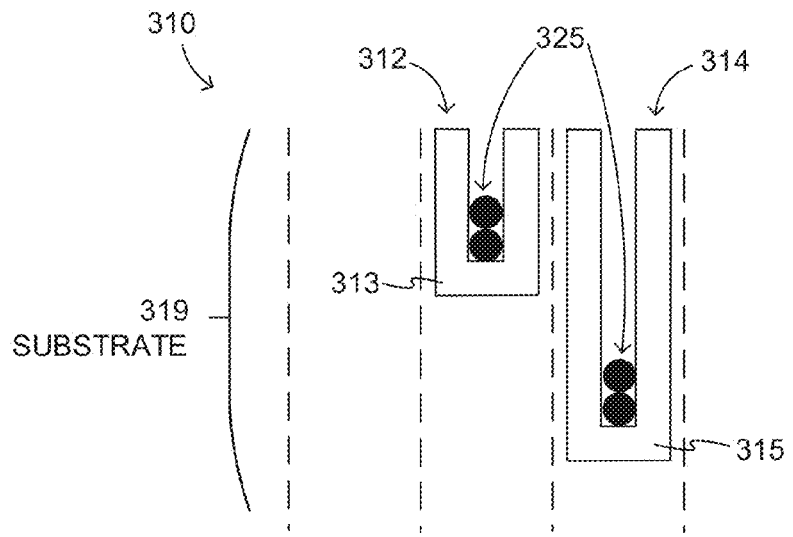
FIG. 3A  *CONCEPTUAL MODEL – ORDINARY ILLUMINATION*
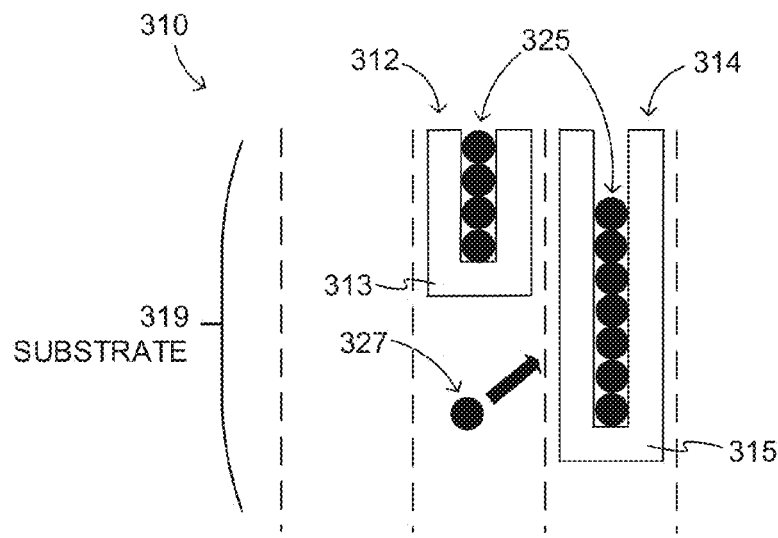
FIG. 3B  *CONCEPTUAL MODEL – BRIGHT ILLUMINATION & SATURATION*

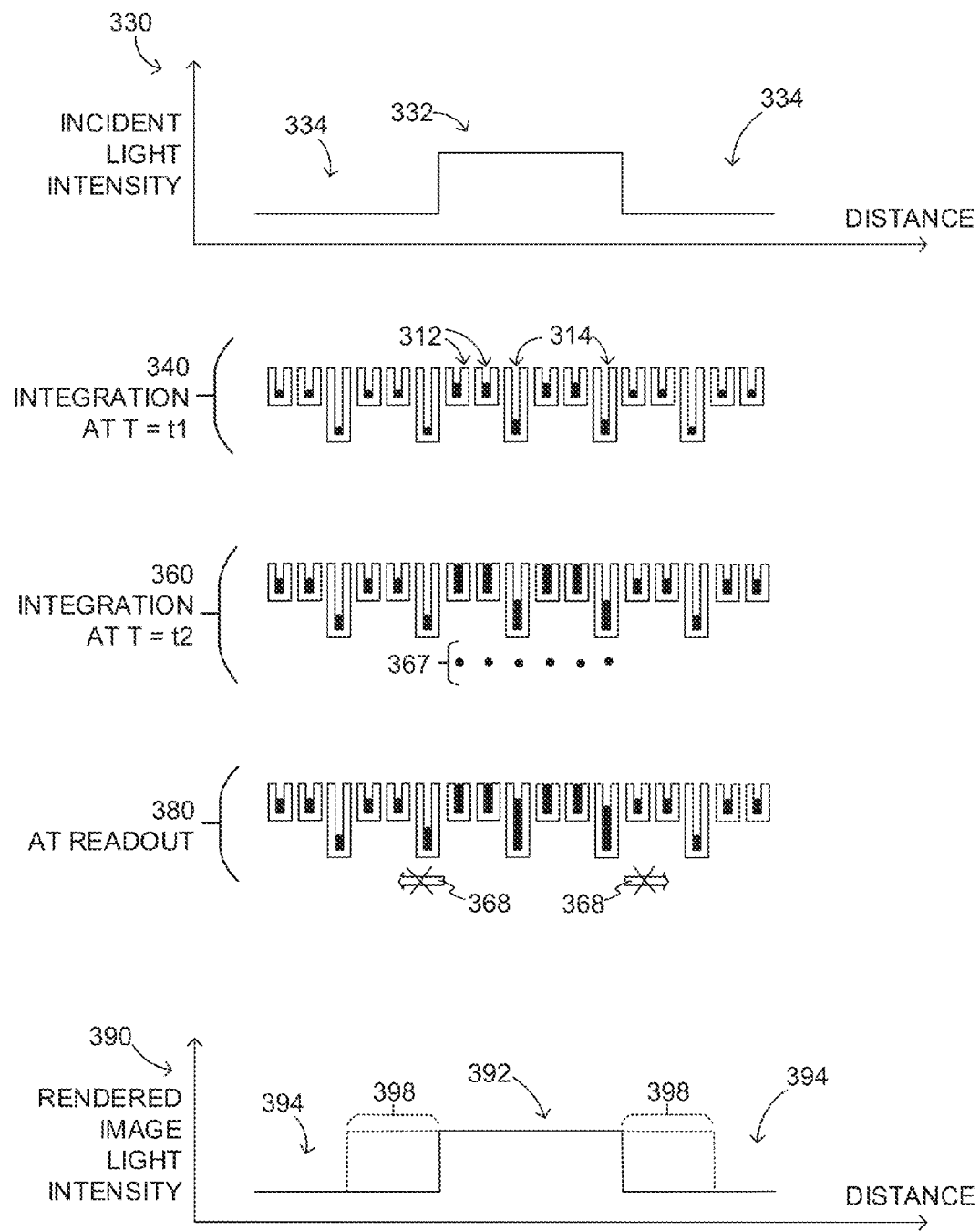
FIG. 3C    IMAGING – CONTROLLING BLOOMING

1T EXAMPLE

CONCEPTUAL MODEL – ORDINARY ILLUMINATION

CONCEPTUAL MODEL – BRIGHT ILLUMINATION & SATURATION

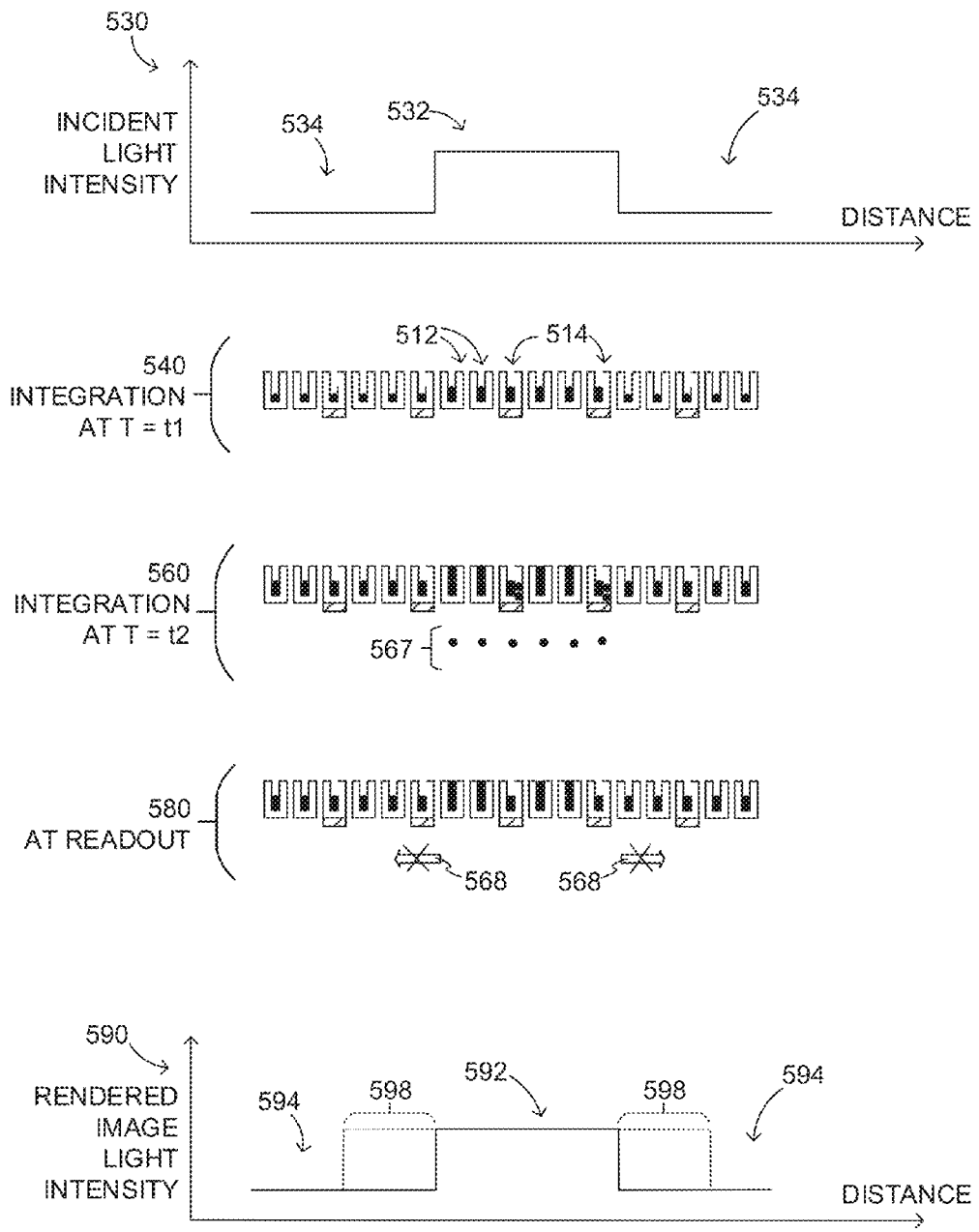
FIG. 5C  IMAGING – CONTROLLING BLOOMING

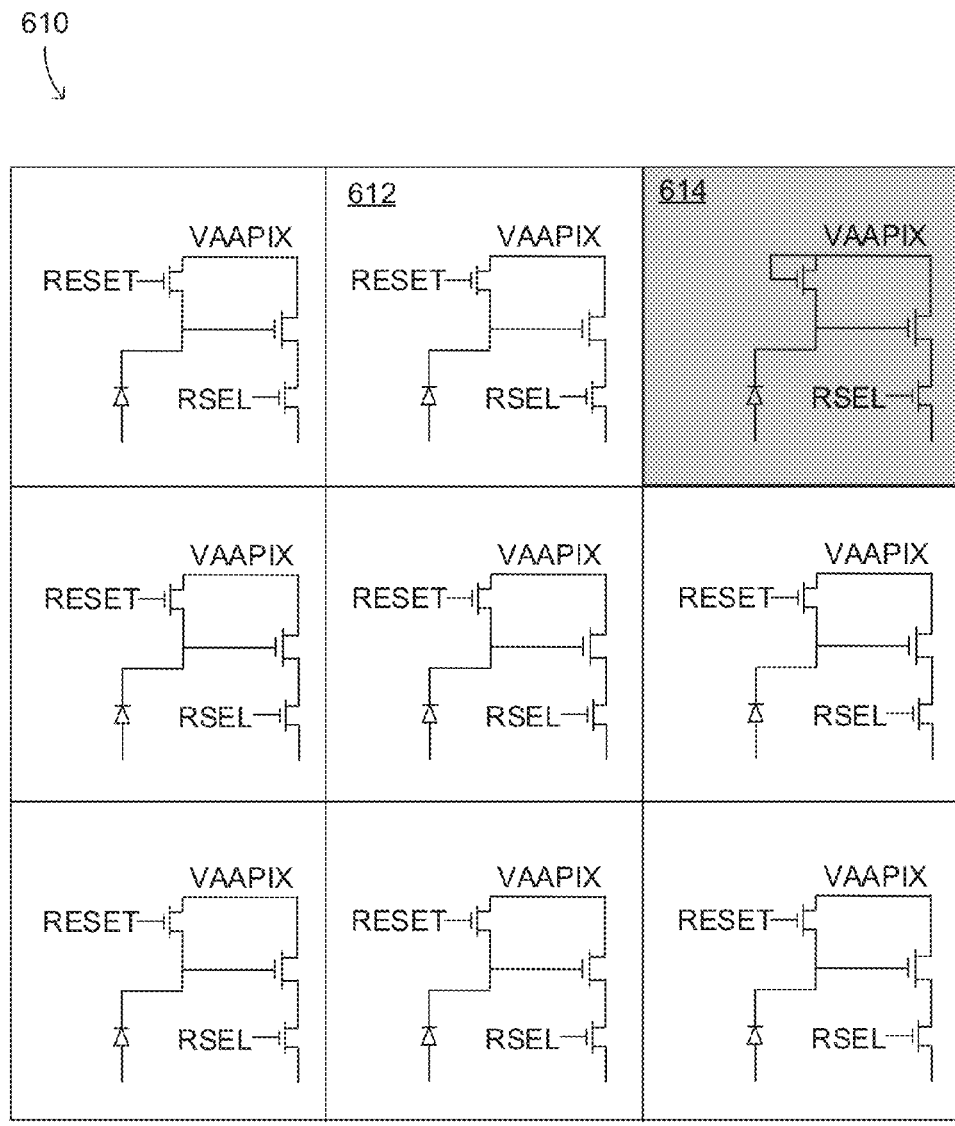
FIG. 6  3T EXAMPLE

FIG. 8 *CONCEPTUAL MODEL - SELECTIVE BINNING OF OUTPUTS*

FIG. 9    METHODS

PIXEL ARRAYS AND IMAGING DEVICES WITH REDUCED BLOOMING, CONTROLLERS AND METHODS

CROSS REFERENCE TO RELATED PATENT APPLICATIONS

This patent application claims priority from U.S. Provisional Patent Application Ser. No. 61/832,140 filed on Jun. 6, 2013, the disclosure of which is hereby incorporated by reference for all purposes.

BACKGROUND

Modern imaging devices use electronic arrays to capture images. The arrays have pixels that generate electric charges, such as electrons, when they are exposed to light from an image. The generated charges of each pixel are stored and then read out, for rendering the image.

A problem in the prior art, which is called blooming, happens when the image has parts that are too bright, such as direct sunlight. The pixels that image the bright parts generate charges in excess of what they can store for reading out. These excess charges then spill over to adjacent pixels, where they become stored instead. As such, these adjacent pixels also render bright parts for the image, even though they are not imaging a bright part. Blooming can reduce image quality.

BRIEF SUMMARY

The present description gives instances of pixel arrays, imaging devices, controllers and methods, the use of which may help overcome problems and limitations of the prior art.

In some embodiments, a pixel array includes regular pixels for imaging, and special pixel sites interspersed among the regular pixels. When the regular pixels become saturated from bright illumination, at least some of their excess charges are removed by the special pixel sites. The removal can reduce or eliminate blooming.

In some embodiments, the special pixel sites include special pixels. For imaging, the regular pixels of a group such as a sub-array provide regular outputs that are combined into a composite signal. The special pixels provide a special output. The special output of the group may optionally be added to the composite signal, which can increase the dynamic range.

These and other features and advantages of this description will become more readily apparent from the following Detailed Description, which proceeds with reference to the drawings, in which:

BRIEF DESCRIPTION OF THE DRAWINGS

FIG. 3A is a side view of a conceptual model of a regular pixel and a special pixel site in a pixel array made according to embodiments.

FIG. 3B is a model of the array of FIG. 3A, when illumination is bright according to embodiments.

FIG. 3C is a sequence of diagrams of a one-dimensional example that uses the models of FIGS. 3A and 3B to show how a pixel array according to embodiments can image bright illumination while controlling blooming.

FIG. 5C is a sequence of diagrams of a one-dimensional example that uses the models of FIGS. 5A and 5B to show how a pixel array according to embodiments can image bright illumination while controlling blooming.

FIG. 6 is an electrical diagram of a portion of a pixel array made according to a 3T embodiment, where the special pixel is continuously in reset.

DETAILED DESCRIPTION

As has been mentioned, the present description is about pixel arrays, imaging devices, controllers and methods that may reduce blooming. Embodiments are now described in more detail.

Figure 1:
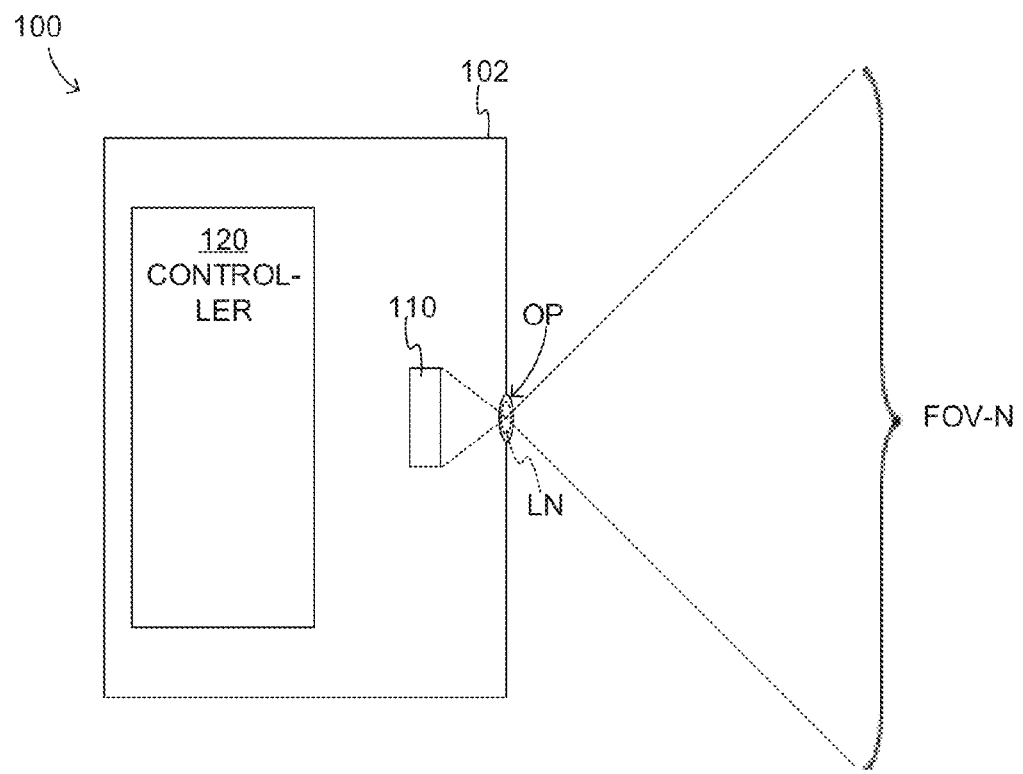
FIG. 1 is a block diagram of an imaging device made according to embodiments.

FIG. 1 is a block diagram of an imaging device 100 made according to embodiments. Imaging device 100 has a casing 102, and includes an opening OP in casing 102. A lens LN may be provided optionally at opening OP, although that is not necessary.

Imaging device 100 also has a pixel array 110 made according to embodiments. Pixel array 110 is configured to receive light through opening OP from an object, person, or scene, which is to be imaged by imaging device 100. As can be seen, pixel array 110 and opening OP define a nominal Field of View FOV-N. Of course, Field of View FOV-N is in three dimensions, while FIG. 1 shows it in two dimensions. Further, if lens LN is indeed provided, the resulting actual field of view may be different than the nominal Field of View FOV-N. Imaging device 100 is aligned so that the object, person, or scene that is to be imaged is within the actual field of view.

Device 100 additionally includes a controller 120, for controlling the operation of pixel array 110 and other components. Device 100 can render the image from the elements captured by the pixels.

The pixels of pixel array 110 can capture elements of the image. In many embodiments, pixel array 110 has a two-dimensional array of pixels. Pixel array 110 can have its pixels arranged in many different ways, such as rotated pixel patterns, and so on. In many embodiments, the array's pixels can be arranged in rows and columns. Examples are now described.

Figure 2:
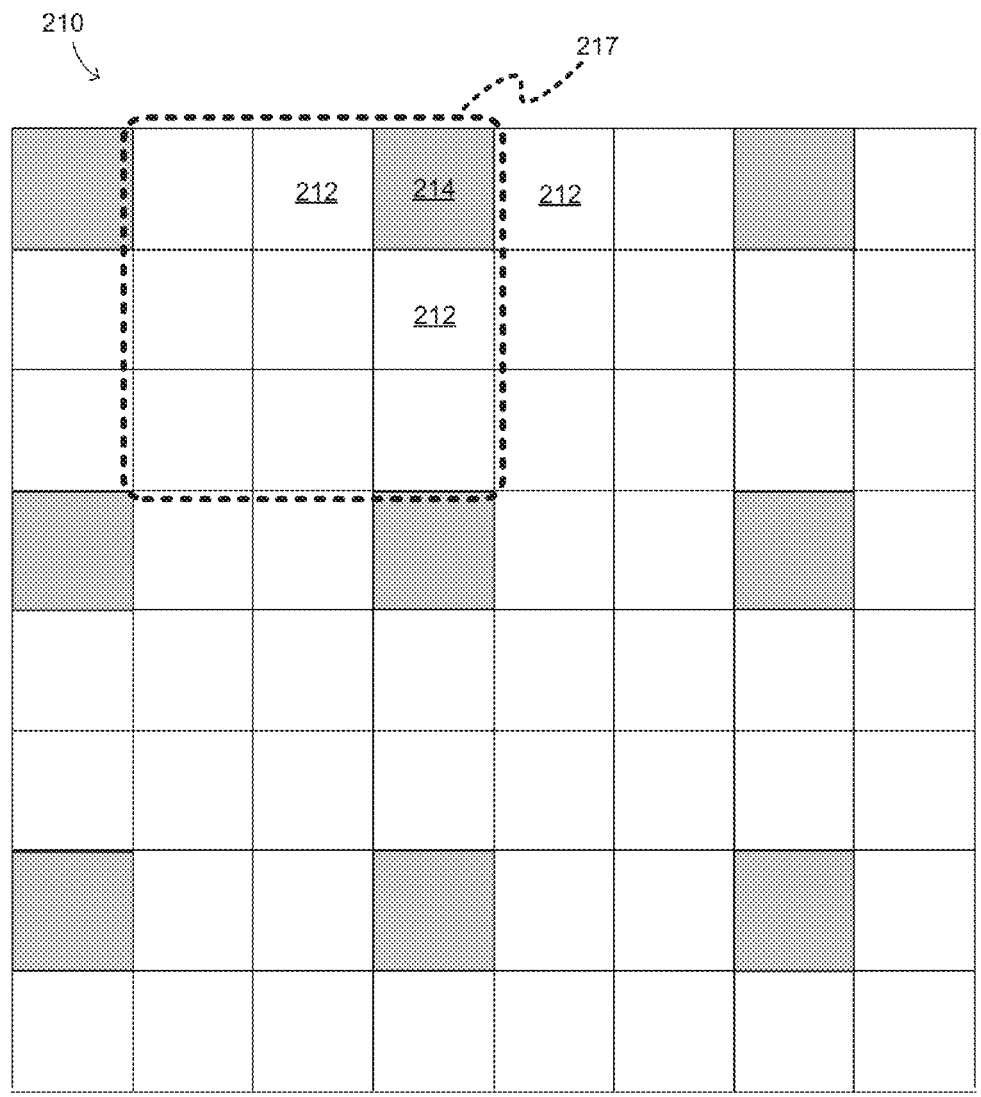
FIG. 2 is a diagram of a top view of a pixel array made according to embodiments.

FIG. 2 is a diagram of a top view of a pixel array 210, made according to embodiments. Pixel array 210 is an example of pixel array 110 of FIG. 1.

Pixel array 210 is a two-dimensional array of pixels. The pixels are drawn as squares, although they need not be square-shaped for practicing the invention. For a different example, the pixels could be rectangular-shaped, and so on.

Pixel array 210 may generally have two types of contents, regular pixels intended for imaging, and special pixel sites intended primarily to control blooming, all of which are arranged as pixels. The regular pixels are drawn as white squares, and three of them are denoted with the reference numeral 212. The special pixel sites are drawn as gray squares, and one of them is denoted as 214. It will be observed that special pixel site 214 is surrounded by regular pixels 212, in the example of FIG. 2.

The regular pixels are intended to capture image information, such as color and/or depth. They can be made with circuits that have a number of transistors, such as one, two, three, four or more transistors. Pixel implementations are also known by the number of their transistors, as "1T", "2T", "3T" and "4T".

In many embodiments, the regular pixels are substantially similar to each other. In fact, they could be identical, or have subtle differences among them. Differences can be, for example, so that they image different colors, such as Red, Green or Blue. For capturing image information, the regular pixels can be configured to generate charges as a result of receiving illumination, such as the light from the thing that is to be imaged. The charges can be electrons or holes, when the pixel array is implemented in semiconductor material. Typically the charges are generated from a diode that is sensitive to light, and is also called a photodiode. When the charges are electrons, they are also known as photoelectrons. The charges are generated during an integration stage, which is akin to exposure time in traditional photography with film. The regular pixels may store some of the charges as image information. At a later stage that is called readout, the charges are removed and counted, so as to reconstruct image information.

The maximum number of charges that a regular pixel can store is also known as a regular maximum. When a regular pixel has stored its regular maximum of charges, it is said to be saturated. When illumination is too bright, the regular pixels may generate charges in excess of its regular maximum. These excess charges might not be able to be otherwise absorbed by the regular pixel in some embodiments. Without more, then, these excess charges are what might cause blooming in the prior art: the excess charges might spill over to adjacent regular pixels, saturate them also, and so on.

The special pixel sites can be made differently than the regular pixels. There are a number of ways of making them different, which are explored later in this document, and which can be used to further define how the regular pixels are similar to each other.

In some embodiments, under some conditions, the special pixel sites can remove some charges, such as excess charges that migrate or spill over from the nearby saturated regular pixels. One such condition is if there is a certain illumination that is received by both special pixel site 214 and its adjacent regular pixels 212, and the result is that pixels 212 saturate and generate excess charges. Some of those excess charges are then removed by pixel site 214, as they migrate to it.

In preferred embodiments, as in FIG. 2, the regular pixels are arranged in rows and columns. In such embodiments, the special pixel sites are within the rows and the columns. In other words, they occupy spaces that might have been occupied by the regular pixels.

In some embodiments, there is no diode in the special pixel sites. When light is received by the special pixel site, no charges become stored that could be read out. The special pixel sites may contain just the right amount of circuitry to drain any excess charges that migrate or spill over to them from adjacent regular pixels, so as to remove them.

In some embodiments, such as in FIG. 2, special pixel site 214 also includes a diode that is configured to generate charges as a result of receiving illumination. In that case, the special pixel site can be said to contain a special pixel. The special pixel site may even be configured to store some charges for the readout phase. Still, when receiving the above mentioned certain illumination that generates excess charges in adjacent regular pixels, special pixel site 214 is configured to remove those excess charges, along with the charges generated by its own photodiode.

As will be seen, in some embodiments and under some conditions, the special pixel also contributes to the reconstructed image by storing its generated charge, and making it available for readout. In some of those instances, the dynamic range of the array can thus become extended, especially for conditions of low illumination.

The maximum number of charges that a special pixel can store is called a special maximum. In some embodiments, when also generating and storing charges, the special pixel may exceed the special maximum, and itself become saturated. In fact, it may become saturated by the certain illumination, as will be seen from the examples below. Even then, the special pixel site can be configured to remove the excess charges received from the adjacent regular pixels, along with the excess charges of its own special pixel.

Another observation about array 210 is that the special pixel sites are interspersed among the regular pixels, and occupying their spaces. Interspersing can happen in a number of patterns. The sample pattern of array 210 is a sifter pattern, with a ratio of 1:8 special-to-regular pixels. Of course, other ratios are possible.

Regarding the size of the regular pixels and the special pixel sites, many embodiments are possible. First, it will be observed that, in the example of array 210, the special pixel sites have substantially the same surface area as the regular pixels. The similarity makes the overall array design easier.

The pixels of array 210 may be large enough so that each captures a unique aspect of the image. In some of these instances, however, the special pixel sites may not contribute well or at all, and other measures may have to be taken.

In other embodiments, the pixels are very small, in fact smaller than the diffraction limit of the light that is expected to be imaged. In those cases, array 210 can be considered divided in sub-arrays, each of which can be about the size of an individual pixel at the minimum attainable resolution. Accordingly, the number of pixels in a sub-array can also depend on the size of the pixels. In FIG. 2, a group 217 of 9 pixels is shown as a sub-array, for embodiments where the pixels of array 210 are indeed that small. The pixels of a sub-array are often called sub-pixels, and their outputs are typically combined to render the image information. It should not be forgotten, however, that sub-pixels can be made as regular pixels. Such sub-pixels can be smaller than, for example, 4 µm on the side, and have a surface area of less than 16 µm$^2$. In fact, such sub-diffraction limit pixels can be on the order of hundreds of nm or less on the side.

Another advantage of embodiments arises when the array is indeed divided in sub-arrays of sub-pixels. In these cases, even where the special sub-pixels do not contribute image information, there is no need to make up for that loss, since their image information can be contributed by the remaining sub-pixels in the sub-array.

Possible differences are now explored, between the regular pixels and the special pixel site, even when the latter contains a special pixel. A model is now described where the special pixel site is simply deeper than the regular pixel.

FIG. 3A is a side view of a conceptual model of a pixel array made 310, which is made according to embodiments in a semiconductor substrate 319. Array 310 is one way of making array 210 of FIG. 2.

In array 310, a sample regular pixel 312 is shown adjacent to a sample special pixel site 314. Regular pixel 312 includes a regular well 313 formed into substrate 319. Special pixel site 314 includes a special well 315 formed into substrate 319. In this embodiment, special pixel site 314 includes a special pixel, although that is not necessary for practicing the invention.

In FIG. 3A, array 310 is subjected to illumination of only ordinary magnitude for the duration of the integration stage. As such, charges 325 are generated at least from regular pixel 312, and are stored in regular well 313 for readout. Regular well 313 does not become filled in the embodiment of FIG. 3A. Regular pixel 312 does not become saturated, as would be expected since the illumination is ordinary.

In addition, charges 325 are generated also from a special pixel contained in site 314, and are stored in special well 315. The charges in special well 315 may be read out or not. However, in embodiments where a special pixel is not contained in pixel site 314, there would be no charges in special well 315.

As can be seen, special pixel site 314 is different from regular pixel 312, in that special well 315 is deeper than regular well 313. In the example of FIG. 3A, where illumination is ordinary, the difference in depth is not of consequence. Special well 315 does not become filled in the embodiment of FIG. 3A.

FIG. 3B is a model of the array of FIG. 3A, when illumination is bright according to embodiments. Pixel 312 generates enough charges 325 to fill regular well 313, and then some excess charges 327. The special pixel in site 314 generates and stores charges 325 in well 315. Excess charges 327 are removed by migrating into special well 315, where they are stored.

Pixel arrays made according to the models of FIGS. 3A and 3B can reduce blooming. A one-dimensional example is now described, referring to FIG. 3C.

Diagram 330 illustrates a sample incident light intensity profile across distance that spans a number of pixels of an array made according to embodiments. The sample incident light intensity profile can have a bright spot 332 in the middle, such as was used in FIG. 3B. It can also have ordinary illumination 334 in the sides, such as was used in FIG. 3A.

Diagram 340 shows models of the pixels along the distance dimension of diagram 330. These models are as examined in FIGS. 3A and 3B. The array includes regular pixels 312 and special pixel sites 314, each of which further contains a special pixel. The wells in the middle are filling with charges faster than those on the sides, because they are subjected to more intense light. However, in diagram 340, integration has only been for a short time t1, and none of the wells is filled.

Diagram 360 shows the models of diagram 340, when integration has been for a longer time t2. Compared with diagram 340, all wells have more charges. In addition, the wells of the regular pixels in the middle, which are subjected to the brighter illumination 332, have been filled to capacity, plus there are excess charges 367 within the substrate.

Diagram 380 shows the models of diagram 360 at read out, which can be very shortly after time t2. Excess charges 367 of diagram 360 are no longer shown, because they have migrated into the deeper wells of the special pixel sites. Because of that, no excess charges 367 have spilled over according to arrows 368 to adjacent regular pixels. That is why arrows 368 are shown crossed out.

Diagram 390 shows the rendered image light intensity profile, resulting from the incident light intensity profile diagram 330. The light intensity profile of diagram 390 is created from the models of diagram 380, in proportion to their stored charges, and ignoring those stored at the special pixel sites. Diagram 390 thus renders a bright image portion 392 in the middle, which corresponds to bright portion 332. Diagram 390 also renders images of ordinary illumination 394 in the sides, which correspond to ordinary illumination 334.

Diagram 390 does not render portions 398 as blooming, namely having the same intensity as portion 392. The reason is that the spilling over of arrows 368 has not happened. As such, a pixel array where the special pixel sites have deeper wells than the regular pixels can prevent blooming, even if the special pixel sites contain special pixels.

The model of FIGS. 3A & 3B can be implemented in a number of ways. One such way, as described above, is to make the special wells, such as well 315, physically deeper, so they can contain and accommodate more of the excess charges.

Another such way is to bias the special well differently than the regular well, so that it can contain more charges. The different biasing could be implemented in a number of ways. For one example, the pixel array could further have two conductive lines. One of the regular pixels can include a regular well in a substrate, and a regular circuit that is coupled to the first, but not necessarily to the second, conductive line for biasing the regular well. The special pixel site can include a special well in a substrate, and a special circuit that is coupled to the second conductive line for biasing the special well, and maybe even also the first. In any event, the connections can be different, to permit the different biasing. The excess charges can be removed by migrating into the special well because it is differently biased. This can be true even if the special circuit is identical to the regular circuit. An example is now described.

Figure 4:
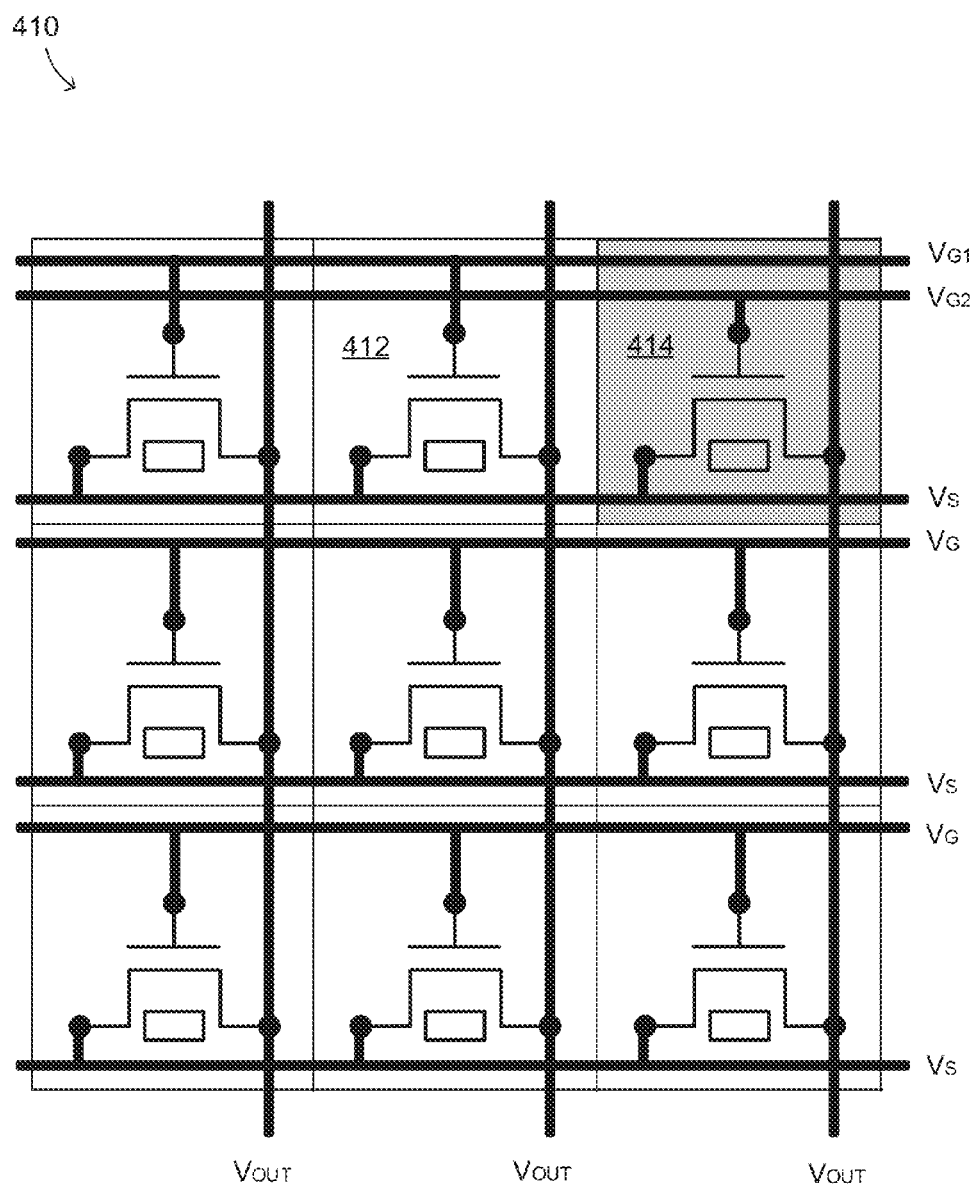
FIG. 4 is an electrical diagram of a portion of a pixel array made according to a 1T embodiment and with different biasing.

FIG. 4 is an electrical diagram of a portion 410 of a pixel array. Portion 410 includes 8 regular pixels, which are shown in white background and one of which is pixel 412. Each regular pixel includes a regular circuit according to a 1T embodiment where the rectangle is a photodiode. Portion 410 also includes a special pixel site 414 which, in this case, also contains a special circuit. In this particular case, the special circuit of site 414 is identical to the regular circuits of the regular pixels, although that is not required.

Portion 410 also includes conductive lines for the operation of at least the regular pixels. For output, each column includes a conductive line $V_{OUT}$. Each row includes a conductive line $V_S$. Moreover, each row of only regular pixels includes a conductive line $V_G$. The row that includes also the special pixel, which is the top row in FIG. 4, instead includes two conductive lines $V_{G1}$ and $V_{G2}$. First line $V_{G1}$ can be coupled as lines $V_G$, only to the regular circuits of the regular pixels, but not to the special circuit of special pixel site 414. Second line $V_{G2}$ can be coupled only to the special circuit of special pixel site 414. The circuits are not coupled to the same lines, and thus conductive line $V_{G2}$ can bias the special circuit of special pixel site 414 differently than conductive line $V_{G1}$ can bias the regular circuit of the regular pixels. As such, special pixel site 414 can store more charges than the regular pixels, and thus the pixel array can exhibit the behavior of FIG. 3C.

For making the particular embodiment of FIG. 4 work, different values can be tried. For example, for the integration phase for the regular pixels, $V_G$, $V_S$ and $V_{OUT}$ could be held to 0V, while $V_{G2}$ could be held at −2V. For the readout stage of at least the regular pixels, $V_G$ could be held at −1.5V, while $V_S$ could be held at −0.5V.

It will be further observed that, having different conductive lines for the special pixel site as opposed to the regular pixels imposes non-uniform design requirements. For example, in FIG. 4 the top row is longer than the others, since it has two conductive lines at the top.

In some embodiments, the regular circuits of the regular pixels are different from the special circuits of the special pixel sites. As such the special circuits remove the excess charges of the adjacent regular pixels. This can be implemented in a number of ways. In some such ways, the pixel includes a conductive line, such as the conductive lines described in FIG. 4. Moreover, the special circuit is made such that it removes the excess charges by draining them into the conductive line. A model is now described.

Figure 5A:
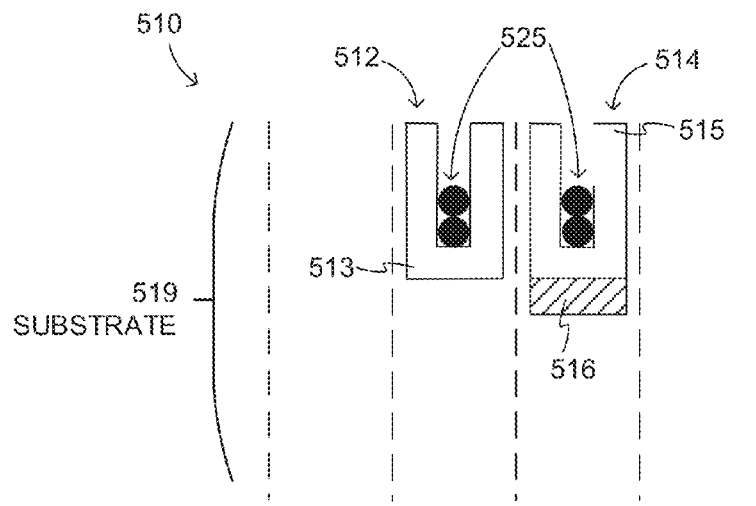
FIG. 5A is a side view of a conceptual model of a regular pixel and a special pixel site in a pixel array made according to embodiments.

FIG. 5A is a side view of a conceptual model of a pixel array made 510, which is made according to embodiments in a semiconductor substrate 519. Array 510 is one way of making array 210 of FIG. 2.

In array 510, a sample regular pixel 512 is shown adjacent to a sample special pixel site 514. Regular pixel 512 includes a regular well 513 formed into substrate 519. Special pixel site 514 includes a special well 515 formed into substrate 519. In this embodiment, special pixel site 514 includes a special pixel, although that is not necessary for practicing the invention.

In FIG. 5A, array 510 is subjected to illumination of only ordinary magnitude for the duration of the integration stage. As such, charges 525 are generated at least from regular pixel 512, and are stored in regular well 513 for readout. Regular well 513 does not become filled in the embodiment of FIG. 5A. Regular pixel 512 does not become saturated, as would be expected since the illumination is ordinary.

In addition, charges 525 are generated also from a special pixel contained in site 514, and are stored in special well 515. The charges in special well 515 may be read out or not. However, in embodiments where a special pixel is not contained in pixel site 514, there would be no charges in special well 515.

As can be seen, special pixel site 514 is different from regular pixel 512, in that it can drain any excess charges over to a line conductor 516. In the example of FIG. 5A, where illumination is ordinary, the difference does not matter. Special well 515 becomes filled to capacity in the embodiment of FIG. 5A, but there are no excess charges.

Figure 5B:
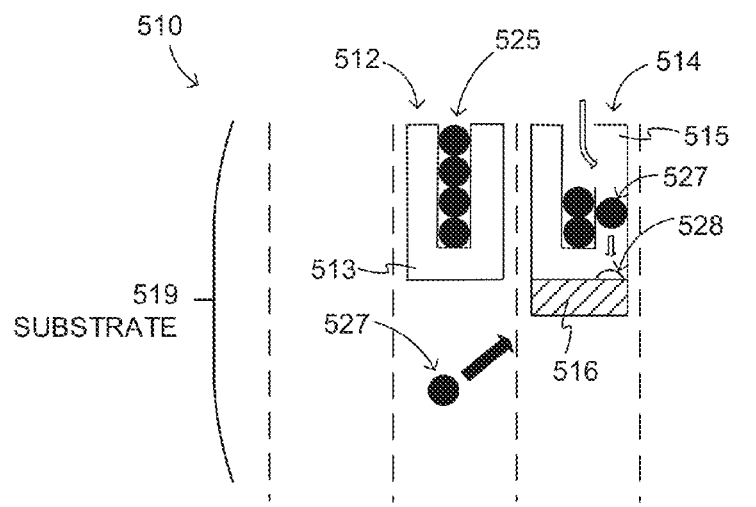
FIG. 5B is a model of the array of FIG. 5A, when illumination is bright according to embodiments.

FIG. 5B is a model of the array of FIG. 5A, when illumination is bright according to embodiments. Pixel 512 generates enough charges 525 to fill regular well 513, and generate some excess charges 527 beyond that. Excess charges 527 are removed by migrating into special well 515, from where they are routed to conductor line 516, and are shown as neutralized charges 528. In addition, the special pixel in site 514 can generate even more charges, which have the same fate as charges 527. Conductor line 516, being connected to a reference voltage or a power supply or other bias voltage, can absorb excess charges 527, and neutralize them into charges 528.

Pixel arrays made according to the models of FIGS. 5A and 5B can reduce blooming. A one-dimensional example is now described, referring to FIG. 5C.

Diagram 530 illustrates a sample incident light intensity profile across distance that spans a number of pixels of an array made according to embodiments. The sample incident light intensity profile can have a bright spot 532 in the middle, such as was used in FIG. 5B. It can also have ordinary illumination 534 in the sides, such as was used in FIG. 5A.

Diagram 540 shows models of the pixels along the distance dimension of diagram 530. These models are as examined in FIGS. 5A and 5B. The array includes regular pixels 512 and special pixel sites 514, each of which further contains a special pixel. The wells in the middle are filling with charges faster than those on the sides, because they are subjected to more intense light. However, in diagram 540, integration has only been for a short time t1, and none of the wells is filled.

Diagram 560 shows the models of diagram 540, when integration has been for a longer time t2. Compared with diagram 540, the wells of the regular pixels in the middle, which are subjected to the brighter illumination 532, have been filled to capacity, plus there are excess charges 567 within the substrate. In addition, the special wells in the middle have been generating excess charges which they have been draining on the line conductor.

Diagram 580 shows the models of diagram 560 at read out, which can be very shortly after time t2. Excess charges 567 of diagram 560 are no longer shown, because they have migrated into the wells of the special pixel sites, from where they have been drained to the line conductor. Because of that, excess charges have not spilled over according to arrows 568 to adjacent regular pixels. That is why arrows 568 are shown crossed out.

Diagram 590 shows the rendered image light intensity profile, resulting by imaging the incident light intensity profile of diagram 530. The light intensity profile of diagram 590 is created from the models of diagram 580, in proportion to their stored charges, and ignoring those stored at the special pixel sites. Diagram 590 thus renders a bright image portion 592 in the middle, which corresponds to bright portion 532. Diagram 590 also renders images of ordinary illumination 594 in the sides, which correspond to ordinary illumination 534.

Diagram 590 does not render portions 598 as blooming, namely having the same intensity as portion 592. The reason is that the spilling over of arrows 568 has not happened. As such, a pixel array where the special pixel sites have been draining the excess charges pixels can prevent blooming, even if the special pixel sites contain special pixels.

In some embodiments, the regular circuits are configured to be capable of placing the regular pixels into and out of a reset stage. The reset stage typically occurs after the readout stage, and before integration for the next image capture. In some of these embodiments, however, the special circuit is configured to maintain the special pixel site continuously at the reset stage, which removes the excess charges. An example is now described.

FIG. 6 is an electrical diagram of a portion 610 of a pixel array. Portion 610 includes 8 regular pixels, which are shown in white background and one of which is pixel 612. Each regular pixel includes a regular circuit according to a 3T embodiment. The regular circuit includes a reset transistor, for resetting according to a signal.

Portion 610 also includes a special pixel site 614 which, in this case, also contains a special circuit. In this particular case, the special circuit of site 614 is somewhat similar to the regular circuits of the regular pixels, except that it is biased to be continuously in the reset mode. Excess charges are drained into the conductive line $V_{AAPIX}$, whether generated within special pixel site 614, or they have migrated from the nearby regular pixels.

In the example of FIG. 6, special pixel site 614 also includes a diode and therefore contains a special pixel. The output of the special pixel can be included in the read out or not, as desired.

Figure 7:
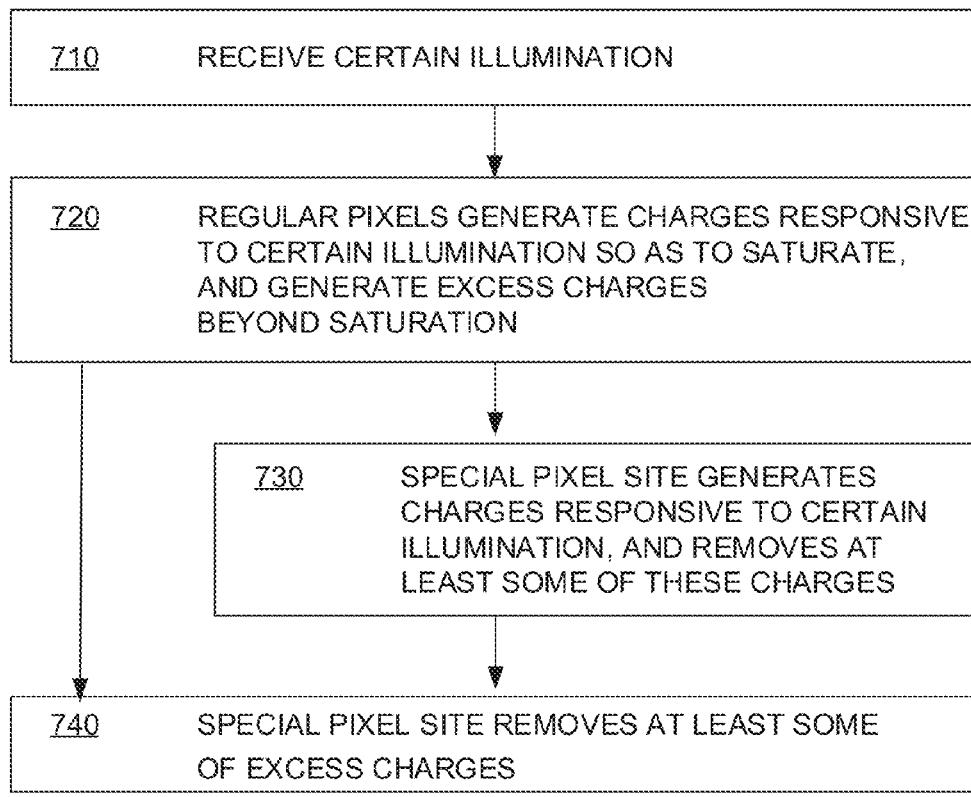
FIG. 7 is a flowchart for illustrating methods according to embodiments.

FIG. 7 shows a flowchart 700 for describing methods according to embodiments. The methods of flowchart 700 is for an array of an imaging device, in which the array includes at least three regular pixels and at least one special pixel site surrounded by the regular pixels and is made differently than the regular pixels. The methods of flowchart 700 may also be practiced by embodiments described above.

According to an operation 710, a certain illumination is received at the regular pixels and the special pixel site of the pixel array.

According to another operation 720, the regular pixels generate charges responsive to the received certain illumination so as to reach saturation, and they generate excess charges beyond saturation.

According to another, optional operation 730, the special pixel site also generates charges responsive to the received certain illumination. The special pixel site further removes at least some of the charges it generates.

According to another operation 740, the special pixel site removes, while receiving the certain illumination, at least some of the excess charges generated by operation 720. Removal can be by storing these excess charges, or draining them to a conductive line, as per the above.

The remaining stored charges can then be read out, for rendering the image. Charges stored in a special pixel, if contained in the special pixel site can be read out, or ignored, or otherwise dealt with.

Figure 8:
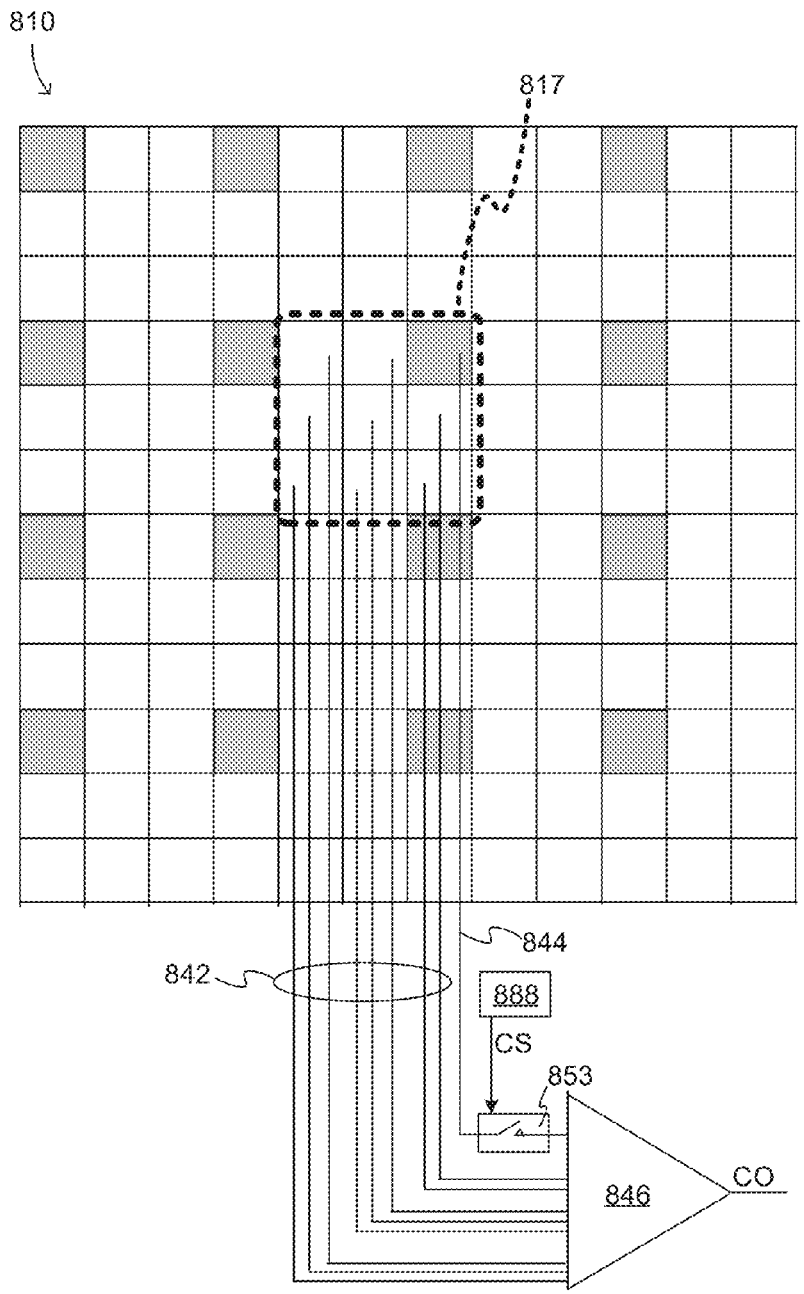
FIG. 8 is a diagram of a top view of a pixel array, made according to embodiments in which the array is divided in sub-arrays, and a sub-array has sub-pixels whose outputs are conceptually shown as combined.

FIG. 8 is a diagram of a top view of a pixel array 810, made according to embodiments. Pixel array 810 is for an imaging device and could be an example of pixel array 110 or 210.

Pixel array 810 may generally have two types of contents, regular pixels intended for imaging, and special pixel sites intended to reduce blooming. The regular pixels and the special pixel sites can be made as above, except that at least some of the special pixel sites contain special pixels. In FIG. 8, the regular pixels are drawn as white squares, while the special pixel sites are drawn as gray squares, similarly with FIG. 2 above.

Pixel array 810 is divided in sub-arrays. One such sub-array is a group of pixels 817, which can alternately be called sub-pixels. In this particular example, there are 8 regular pixels and one special pixel site in sub-array 817, although different numbers are possible. The charges stored by the regular pixels of sub-array 817 are intended for use as regular outputs 842, during the readout stage. The charges stored by the special pixel of sub-array 817 are intended for use as a special output 844, during the readout stage.

Pixel array 810 optionally also includes a readout mechanism 846. Readout mechanism 846 is configured to combine regular outputs 842 into a composite output CO. Composite output CO is intended for rendering an image for the imaging device of pixel array 810. It will be appreciated that readout mechanism 846 is shown conceptually only, because of the many embodiments that are possible. For example, combining—also known as "binning"—can be performed as an analog operation or as a digital operation, concurrently with the readout operation or not, and so on.

Pixel array 810 optionally further includes a signal generator 888. Signal generator 888 is configured to generate a control signal CS.

Pixel array 810 can additionally include a switch 853. Switch 853 can be configured to receive control signal CS, and to control readout mechanism 843 responsive to a value of control signal CS. For some of these values, composite output CO includes special output 844, while for other values it does not. Control signal CS can be further adjusted in view of how much light intensity is perceived in general. For example, control signal CS can be further adjusted in accordance with a value of composite signal CO. This adjustment can extend the dynamic range of pixel array 810 for scenarios of low level illumination.

In some embodiments, one or more readout mechanism 846, signal generator 888, and switch 853 are not literally parts of pixel array 810, but equivalently part of a controller that controls pixel array 810. In some embodiments, the controller is formed integrally with the array anyway.

Figure 9:
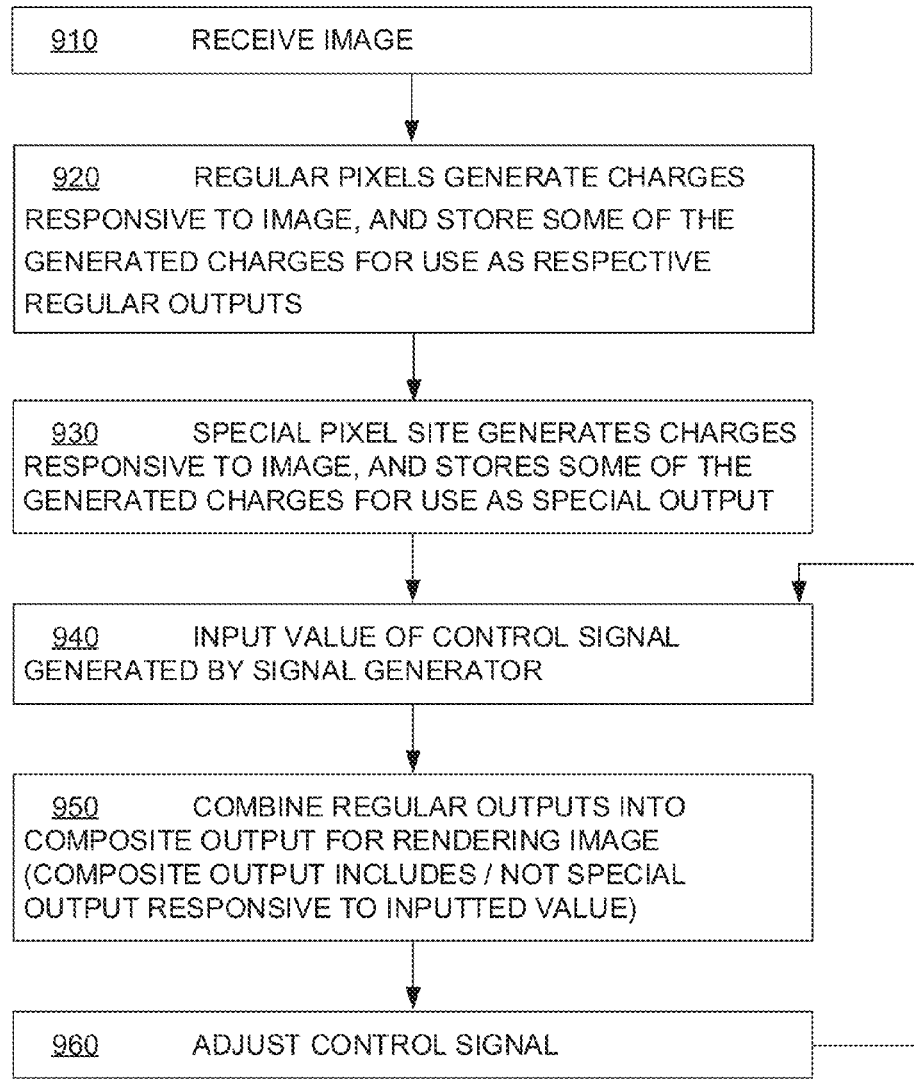
FIG. 9 is a flowchart for illustrating methods according to embodiments.

FIG. 9 shows a flowchart 900 for describing methods according to embodiments. The methods of flowchart 900 are for an imaging device that includes an array and a signal generator, and in which the array includes at least three regular pixels and at least one special pixel site. The methods of flowchart 900 may also be practiced by embodiments described above.

According to an operation 910, an image is received at the array.

According to another operation 920, the regular pixels generate charges responsive to the received image, and store some of the generated charges for use as respective regular outputs.

According to an additional operation 930, the special pixel site generates charges responsive to the received image, and stores some of the generated charges for use as a special output.

According to one more operation 940, a value is inputted, of a control signal that is generated by the signal generator.

According to a next operation 950, the regular outputs are combined into a composite output, for rendering the image for the imaging device. In addition, the composite output may include the special output, depending on the value of the control signal that was inputted at operation 940.

According to an optional next operation 960, the control signal is adjusted, and operations 940 and 950 can be repeated. For operation 960, the control signal can be adjusted in any number of ways. These ways may have to do with how large is the composite signal of these or other pixels. So, for example, the composite signal may be input, and the control signal may be adjusted in accordance with the value of the composite signal.

In the above, the order of operations is not constrained to what is shown, and different orders may be possible according to different embodiments. In addition, in certain embodiments, new operations may be added, or individual operations may be modified or deleted.

Figure 10:
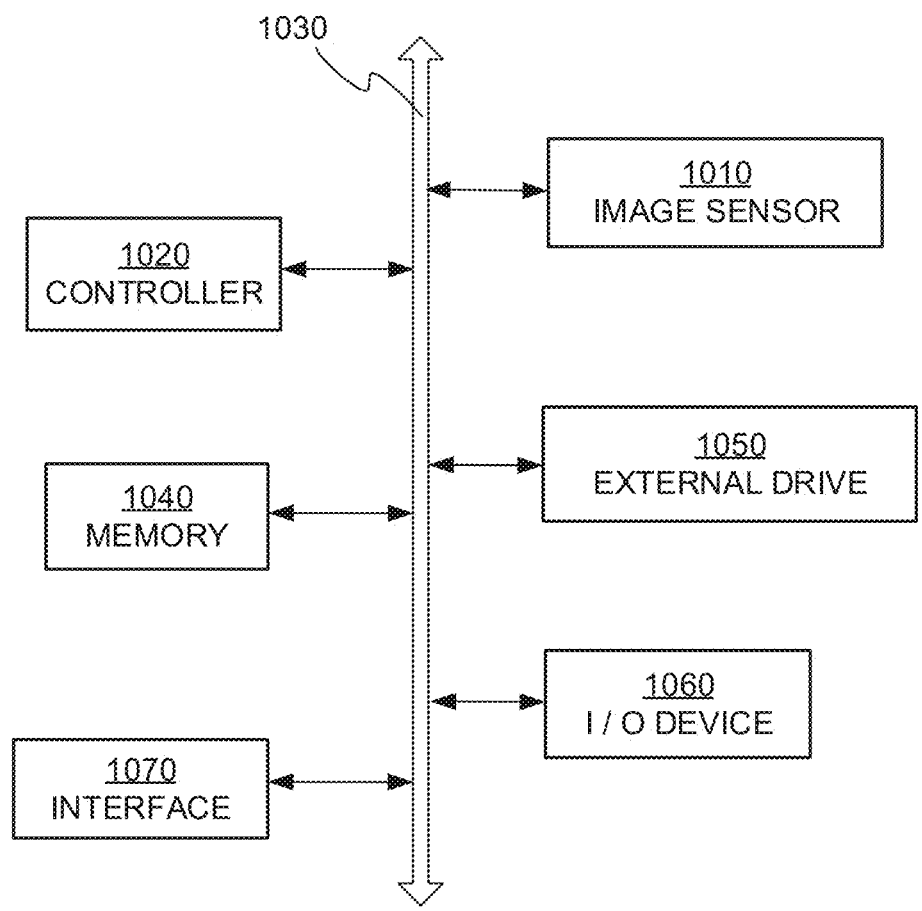
FIG. 10 depicts a controller-based system for an imaging device, which uses an imaging array made according to embodiments.

FIG. 10 depicts a controller-based system 1000 for an imaging device made according to embodiments. System 1000 could be for the device of FIG. 1.

System 1000 includes an image sensor 1010, which is made according to embodiments, such as by a pixel array. As such, system 1000 could be, without limitation, a computer system, an imaging device, a camera system, a scanner, a machine vision system, a vehicle navigation system, a smart telephone, a video telephone, a personal digital assistant (PDA), a mobile computer, a surveillance system, an auto focus system, a star tracker system, a motion detection system, an image stabilization system, a data compression system for high-definition television, and so on.

System 1000 further includes a controller 1020, which could be a CPU, a digital signal processor, a microprocessor, a microcontroller, an application-specific integrated circuit (ASIC), a programmable logic device (PLD), and so on. In some embodiments, controller 1020 communicates, over bus 1030, with image sensor 1010. In some embodiments, controller 1020 may be combined with image sensor 1010 in a single integrated circuit. Controller 1020 controls and operates image sensor 1010, by transmitting control signals from output ports, and so on, as will be understood by those skilled in the art.

Controller 1020 may further communicate with other devices in system 1000. One such other device could be a memory 1040, which could be a Random Access Memory (RAM) or a Read Only Memory (ROM). Memory 1040 may be configured to store instructions to be read and executed by controller 1020.

Another such device could be an external drive 1050, which can be a compact disk (CD) drive, a thumb drive, and so on. One more such device could be an input/output (I/O) device 1060 for a user, such as a keypad, a keyboard, and a display. Memory 1040 may be configured to store user data that is accessible to a user via the I/O device 1060.

An additional such device could be an interface 1070. System 1000 may use interface 1070 to transmit data to or receive data from a communication network. The transmission can be via wires, for example via cables, or USB interface. Alternately, the communication network can be wireless, and interface 1070 can be wireless and include, for example, an antenna, a wireless transceiver and so on. The communication interface protocol can be that of a communication system such as CDMA, GSM, NADC, E-TDMA, WCDMA, CDMA2000, Wi-Fi, Muni Wi-Fi, Bluetooth, DECT, Wireless USB, Flash-OFDM, IEEE 802.20, GPRS, iBurst, WiBro, WiMAX, WiMAX-Advanced, UMTS-TDD, HSPA, EVDO, LTE-Advanced, MMDS, and so on.

A person skilled in the art will be able to practice the present invention in view of this description, which is to be taken as a whole. Details have been included to provide a thorough understanding. In other instances, well-known aspects have not been described, in order to not obscure unnecessarily the present invention.

This description includes one or more examples, but that does not limit how the invention may be practiced. Indeed, examples or embodiments of the invention may be practiced according to what is described, or yet differently, and also in conjunction with other present or future technologies.

One or more embodiments described herein may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "computer-readable media" includes computer-storage media. For example, computer-storage media may include, but are not limited to, magnetic storage devices (e.g., hard disk, floppy disk, and magnetic strips), optical disks (e.g., compact disk [CD] and digital versatile disk [DVD]), smart cards, flash memory devices (e.g., thumb drive, stick, key drive, and SD cards), and volatile and nonvolatile memory (e.g., RAM and ROM).

Other embodiments include combinations and sub-combinations of features described herein, including for example, embodiments that are equivalent to: providing or applying a feature in a different order than in a described embodiment, extracting an individual feature from one embodiment and inserting such feature into another embodiment; removing one or more features from an embodiment; or both removing a feature from an embodiment and adding a feature extracted from another embodiment, while providing the advantages of the features incorporated in such combinations and sub-combinations.

The following claims define certain combinations and subcombinations of elements, features and steps or operations, which are regarded as novel and non-obvious. Additional claims for other such combinations and subcombinations may be presented in this or a related document.

In the claims appended herein, the applicant invokes 35 U.S.C. §112, paragraph 6 only when the words "means for" or "steps for" are used in the claim. If such words are not used in a claim, then the applicant does not intend for the claim to be construed to cover the corresponding structure, material, or acts described herein, and equivalents thereof, in accordance with 35 U.S.C. §112, paragraph 6.

What is claimed is:

1. An array, comprising:
at least one group of eight substantially similar regular pixels to capture image information and one special pixel site surrounded by the eight regular pixels, the eight regular pixels arranged in three contiguous rows and in three contiguous columns, each of the eight regular pixels configured to generate charges as a result of receiving a certain illumination and to store a respective regular maximum of the generated charges, but not to store excess charges generated beyond its respective regular maximum, the special pixel site having a surface area that is substantially equal to a surface area of any of the eight regular pixels, the special pixel site made differently than the regular pixels such that the special pixel site is configured to remove at least some of the excess charges at the certain illumination; and
a readout mechanism to combine outputs of the at least one group of the eight regular pixels into a composite output, the composite output selectively including an output of the special pixel site as part of the composite output based on an illumination value of the composite output of the at least one group of the eight regular pixels.

2. The array of claim 1, in which
the special pixel site of the at least one group also includes a photodiode configured to generate charges as a result of receiving the certain illumination, and
the special pixel site of the at least one group is configured to remove the charges generated by the photodiode as a result of receiving the certain illumination.

3. The array of claim 1, in which
each of the special pixel site and the eight regular pixels of the at least one group has a surface area of less than 16 µm$^2$.

4. The array of claim 1, in which
the array is made in a semiconductor substrate,
the eight regular pixels of the at least one group include regular wells formed into the semiconductor substrate,
the special pixel site of the at least one group includes a special well formed into the semiconductor substrate, the special pixel site being different from the eight regular pixels of the at least one group in that the special well is deeper than the regular wells, and
the excess charges are removed by migrating into the special well.

5. The array of claim 1, in which the composite output is to render an image.

* * * * *